US007457783B2

(12) United States Patent
Kawabata et al.

(10) Patent No.: US 7,457,783 B2
(45) Date of Patent: Nov. 25, 2008

(54) IMPORT AND EXPORT EXPENSE CALCULATION APPARATUS

(75) Inventors: Katsura Kawabata, Sakai (JP); Mitsuki Wada, Nishinomiya (JP); Takashi Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 666 days.

(21) Appl. No.: 11/034,870

(22) Filed: Jan. 14, 2005

(65) Prior Publication Data

US 2005/0160121 A1  Jul. 21, 2005

(30) Foreign Application Priority Data

Jan. 14, 2004 (JP) ............... 2004-007345

(51) Int. Cl.
*G06F 17/00* (2006.01)
*G06Q 10/00* (2006.01)

(52) U.S. Cl. .......................... 705/400; 705/1
(58) Field of Classification Search ................ 705/400, 705/1
See application file for complete search history.

(56) References Cited

U.S. PATENT DOCUMENTS

| 2002/0026371 | A1* | 2/2002 | Kishi ........................ 705/26 |
| 2002/0035549 | A1* | 3/2002 | Hagio et al. ................ 705/400 |
| 2002/0091574 | A1* | 7/2002 | Lefebvre et al. ............ 705/19 |
| 2002/0138412 | A1* | 9/2002 | Englert ...................... 705/38 |
| 2003/0187808 | A1* | 10/2003 | Alfred et al. ............... 705/400 |
| 2004/0172321 | A1* | 9/2004 | Vemula et al. .............. 705/8 |

FOREIGN PATENT DOCUMENTS

| JP | 2002-92395 | 3/2002 |
| JP | 3092185 | 2/2003 |

OTHER PUBLICATIONS

Friedman, Jack P. Dictionary of Business Terms, Third Edition. Barron's Educational Series, Inc. p. 376.*
Thompson, Kenneth N et al., "Gauging the value of suppliers' products: Buyer-side applications of economic value pricing models," 1994, Journal of Business & Industrial Marketing. v9n2 pp. 29-40.*

* cited by examiner

*Primary Examiner*—John W Hayes
*Assistant Examiner*—Allen J Jung
(74) *Attorney, Agent, or Firm*—Wenderoth, Lind & Ponack, L.L.P.

(57) ABSTRACT

An import/export expense calculation apparatus assisting optimal-location purchasing of materials in a global production framework, and a method thereof. The import/export expense calculation apparatus includes: an input unit for receiving contract information, local price, and import/export expense information; a storage unit holding a master table storing the import/export expense information, and a calculation table storing import/export expense ratio calculation logic; a calculation unit calculating the landed price, from the local price of the material, based on input information; a display unit displaying the calculated landed cost; and a communication unit transmitting the landed price to a factory procurement apparatus. The calculation unit standardizes the currency unit for the local price at the importing-side and the landed price of the material based on currency exchange information, and calculates a lead time of the material based on lead time calculation information.

12 Claims, 18 Drawing Sheets

FIG. 4

Input contract information

| Part No | X01 | ① |
| --- | --- | --- |
| Category | Transistor | ② |
| Contract currency | ¥ | ③ |
| FOR unit price | 10 | ④ |
| Effectivity period ① | 2003/12/1 | ⑤ |
| Procurement L/T | 30 | ⑥ |
| Packing unit | 2000 | ⑦ |
| Final packing | 2000 | ⑧ ← ⑦ |
| Procurement location | Japan | ⑨ → Master2 |
| Exporter | CITD | ⑩ ← Master2 |
| Shipment | AIR | ⑪ → 「Master4〜7」 or 「Master8〜11」 |
| Effectivity period ② | 2004/1/15 | ⑫ → ⑰ |

FIG. 5

Standard packing size / Master 1

| Category name | Volume unit price @million yen/MW |
|---|---|
| ② → Transistor | 0.9 |
| E-CAP | 0.7 |
| Diode | 0.6 |
| Chip resistor | 0.8 |
| Chip CAPA | 0.7 |
| IC | 0.7 |
| . | |
| . | |
| . | |

FIG. 6A

Number of days of procurement warehouse storage (days) / Master 12

⑨→

| ... | Japan | Hong Kong | Malaysia | Singapore |
|---|---|---|---|---|
| | 10 | 10 | | |

FIG. 6B

Warehouse expense (1 period=10 days) / Master 14

⑨→                                    Master3 →

| Volume unit price (million yen) | Japan (%) | Hong Kong (%) | Malaysia (%) | Singapore (%) |
|---|---|---|---|---|
| min | | | | |
| ~1 | 2 % | 2% | 2% | 2% |
| 1~10 | 1.7 % | | | |
| 10~50 | 1.5 % | | | |
| 50~100 | 1.4 % | | | |

Master1 →

FIG. 7

Expense calculation logic

| | Entry | % | |
|---|---|---|---|
| Master12, 14 → | Export warehouse expense | 2.000% | Roundup(Value(Master12)/10.0)*Value(Master14) |
| Master17 → | Export Margin | 2.000% | |
| Master19, 20 → | Export Interest | 1.000% | Value(Master20)/30*Value(Master19) |
| Master4 → | Export expense | 2.000% | |
| | SUB-TTL① | 7.000% | |
| Master6 → | FREIGHT | 5.000% | |
| Master16 → | Marine insurance | 1.000% | |
| | SUB-TTL② | 13.000% | |
| Master5 → | Import expense | 3.000% | |
| Master13, 14 → | SP warehouse expense | 2.000% | Roundup(Value(Master13)/10.0)*Value(Master14) |
| Master15 → | SP transportation expense | 1.000% | |
| Master19, 20 → | Import interest | 1.000% | Value(Master21)/30*Value(Master19) |
| Master18 → | Import margin | 3.000% | |
| | TTL | 23.000% | |

FIG. 8

Per-location L/T derivation logic

| | Entry | days | |
|---|---|---|---|
| ⑥ → | Procurement L/T | 30 | |
| Master12 → | Parts procurement L/T without logistic L/T | 10 | |
| Master7 → | Distribution L/T | 5 | |
| Master13 → | SP storage | 15 | |
| Per-location L/T | | 60 | ⑥+Value(Master12)+VALUE(Master7)*VALUE(Master13) |

FIG. 9

Per-location landed price (Yen converted price) ⑫→

| Factory ⑬ | FOB | CIF | LANDED (without Duty) | Effectivity period ② | Total L/T |
|---|---|---|---|---|---|
| A-Factory | ⑭ 10.7 | ⑮ 11.3 | ⑯ 12.3 | ⑰ 2004/1/15 | ⑱ 60 |
| B-Factory | | | | | |
| C-Factory | | | | | |

⑭ = ④*(100%+a)
⑮ = ④*(100%+b)
⑯ = ④*(100%+c)
⑰ = Input to ⑫
⑱ = d

FIG. 16

Import/Export expense master register | Cancel | Close | Help |

Search | Add | Delete | Update |

PM Code [ ]  PM name [ ]

| Exporting country code | Exporting country | Ordering section code | Ordering section | Number of days of warehouse storage |
|---|---|---|---|---|
| ▶ | | ▶ | | |
| ▶ | | ▶ | | |
| ▶ | | ▶ | | |
| ▶ | | ▶ | | |
| ▶ | | ▶ | | |
| ▶ | | ▶ | | |
| ▶ | | ▶ | | |
| ▶ | | ▶ | | |
| ▶ | | ▶ | | |
| ▶ | | ▶ | | |

Column tabs (left group): Stock point transportation expense / Importing and exporting country / Export expense / Marine insurance / Stock point / Import expense / Standard packing size / Transportation expense / Export margin / Import margin / Importing and exporting country/Importer and exporter correspondence / Customs lead time / Interest / Number of days of interest advance by exporter / Number of days of interest advance by importer / Ordering section/Importing country stock point correspondence / Number of days of procurement warehouse storage / Number of days of stock point warehouse storage / Warehouse expense / Number of days of warehouse storage

IMPORT AND EXPORT EXPENSE CALCULATION APPARATUS

BACKGROUND OF THE INVENTION (1) Field of the Invention

The present invention relates to an import and export expense calculation apparatus, and a method thereof, used in a system, and the like, for assisting optimal-location purchasing of materials in a global production framework.

(2) Description of the Related Art

In recent years, export and import expense calculation apparatuses for the import and export of material, and method thereof, using various methods, have been proposed (see Japanese Laid-Open Patent Application No. 2002-92395 Publication, for example).

In the case of the international procurement of a certain material in the technology disclosed in the aforementioned publication, a base location, to serve as an importing-side, is selected from among two points to undergo import and export simulation. Subsequently, the overhead expense (import and export cost) required for the import and export, from a location serving as an export origin, to the base point, is input. When the total for the import and export cost is known in advance, the total is input as the import and export cost. When the total is not known, customs duty, transportation cost, and packing cost, are input. Among these, the transportation cost and the packing cost are calculated based on an import and export cost table made in advance. The calculation result is displayed on a display unit.

BRIEF SUMMARY OF THE INVENTION

However, the problems described below exist in the conventional technology.

Due to the inadequacy of various import and export expense entries for calculating the import and export expense required for the international procurement of materials, the low accuracy of the calculated price exists as a problem.

Furthermore, as only one point at a time can be selected for the base location serving as the importing-side, convenience is low as repeated operation is required in order to perform a unit cost comparison for importing the same material from a plurality of locations.

Furthermore, when an exchange rate for equalizing two prices is calculated by comparing prices which are in different currencies, convenience is low as it is necessary to compare the obtained equalizing exchange rate with the actual exchange rate at that time. In addition, the possibility of the user erroneously judging (i) which exchange rate results in the lowest cost (ii) and which procurement source is appropriate, is heightened.

In addition, as it merely selects the low-cost procurement source without considering any material lead time information, the occurrence of problems such as materials not being procured within the required time, is possible.

The present invention is conceived in order to solve the aforementioned problems and has as an objective to provide an import and export expense calculation apparatus and method, for assisting optimal-location purchasing of materials in a global production framework.

In order to achieve the abovementioned objective, the import and export expense calculation apparatus according to the present invention is an import and export expense calculation apparatus for assisting international procurement of a material. The apparatus includes: an input unit operable to receive inputs of contract information, local price, and import and export expense basic information, of the material; a calculation unit operable to calculate, based on the input information, a landed price at an importing-side, from the local price of the material; and a display unit operable to display the calculated landed cost. The import and export expense calculation apparatus according to the present invention further includes a storage unit operable to hold a master table storing the import and export expense basic information, and a calculation table storing an import and export expense ratio calculation logic, wherein the calculation unit is operable to obtain, based on the contract information, calculation information by referring to the master table, and operable to obtain an import and export expense ratio based on the calculation information and the import and export expense ratio calculation logic. The import and export expense basic information includes at least one of the following information: standard packing size; exporter; importer; number of days of export warehouse storage; export warehouse expense; export margin; export interest; number of days of interest advance by exporter; export expense; transportation expense; marine insurance; import expense; number of days of import warehouse storage; import warehouse expense; import interest; number of days of interest advance by importer; and import margin. In addition, the export warehouse expense, the export margin, the export interest, the export expense, the transportation expense, the marine insurance, the import expense, the import warehouse expense, the import interest, and the import margin are stored in the master table as percentage values per material.

Accordingly, it is possible to accurately and conveniently calculate, from the local prices of the material at the respective procurement locations, the respective LANDED prices which include overhead expenses required during importation, and the local price of the same material at the importing-side, and compare these. As such, it is possible to procure from the lowest costing location among the procurement sources worldwide.

Furthermore, the input unit is operable to further receive an input of lead time calculation information for the material, and the calculation unit is operable to further calculate a lead time for the material based on the lead time calculation information. In addition, the lead time calculation information includes at least one information from among procurement lead time, part procurement lead time without logic lead time, distribution lead time, and storage lead time.

Accordingly, aside from the cost comparison of the materials, determination of the optimal procurement source with consideration being given to the procurement lead time information becomes possible.

The input unit is operable to further receive currency exchange information for a currency of a local price of the material at the importing-side and a currency of the landed price, and the calculation unit is operable to standardize a currency unit for the local price of the material at the importing-side and the landed price, based on the currency exchange information. The display unit is operable to simultaneously display the local price and the landed price in the standardized currency unit.

Accordingly, a comparison of respective prices having a standardized currency unit can be performed precisely, the determination of the optimal procurement location by the user can be assisted.

The import and export expense calculation apparatus according to the present invention further includes a communication unit operable to transmit the landed price to a purchase contracting apparatus by which a user makes a purchase contract for the material.

Accordingly, as the result of the calculation by the import and export expense calculation apparatus being automatically transmitted to a respective purchase contracting apparatus located in respective counties, optimal information can be instantaneously transmitted to the person determined for the purchase contract, in the respective countries.

By using the import and export expense calculation apparatus and method thereof, according to the present invention, it is possible to accurately calculate, from the local prices of the material at the respective procurement locations, the respective LANDED prices which include overhead expenses required during importation, and the local price of the same material at the importing-side, and compare these. Therefore, procurement from the lowest costing location among the procurement sources worldwide can be carried out, which is a benefit of high practical value.

In addition, aside from cutting costs in the procurement of materials in a global production framework, the speeding-up of material procurement, and the strengthening of coordination between the respective locations through the automatic transmission of the calculation results to the respective procurement locations, also becomes possible.

Aside from the cost comparison of the materials, determination of the optimal procurement source, with consideration being given to procurement lead time information, becomes possible.

Furthermore, the present invention can be implemented as an import and export expense calculation method including the steps which are characteristic of the import and export expense calculation apparatus in the present invention, and in addition, the present invention can also be implemented as a program including such steps. Such program can be distributed via a recording medium such as a CD-ROM and a transmission medium such as a communication network.

BRIEF DESCRIPTION OF THE DRAWINGS

FIG. 4 is a diagram showing the input contract information of the import and export expense calculation apparatus in the first embodiment.

FIG. 5 is a diagram showing information related to standard packing sizes.

FIG. 6A is a diagram showing information related to the number of days of procurement warehouse storage.

FIG. 6B is a diagram showing information related to warehouse expenses.

FIG. 7 is a diagram showing information related to import and export expense ratio calculations for the import and export expense calculation apparatus in the first embodiment.

FIG. 8 is a diagram showing information related to per-location L/T calculations for the import and export expense calculation apparatus in the first embodiment.

FIG. 9 is a diagram showing information related to per-location LANDED prices for the import and export expense calculation apparatus in the first embodiment.

FIG. 16 is a diagram showing the import and export expense master register screen of the import and export expense calculation apparatus in the first embodiment.

DETAILED DESCRIPTION OF THE INVENTION

Hereinafter, the embodiments of the present invention shall be explained with reference to the diagrams.

First Embodiment

Figure 1:
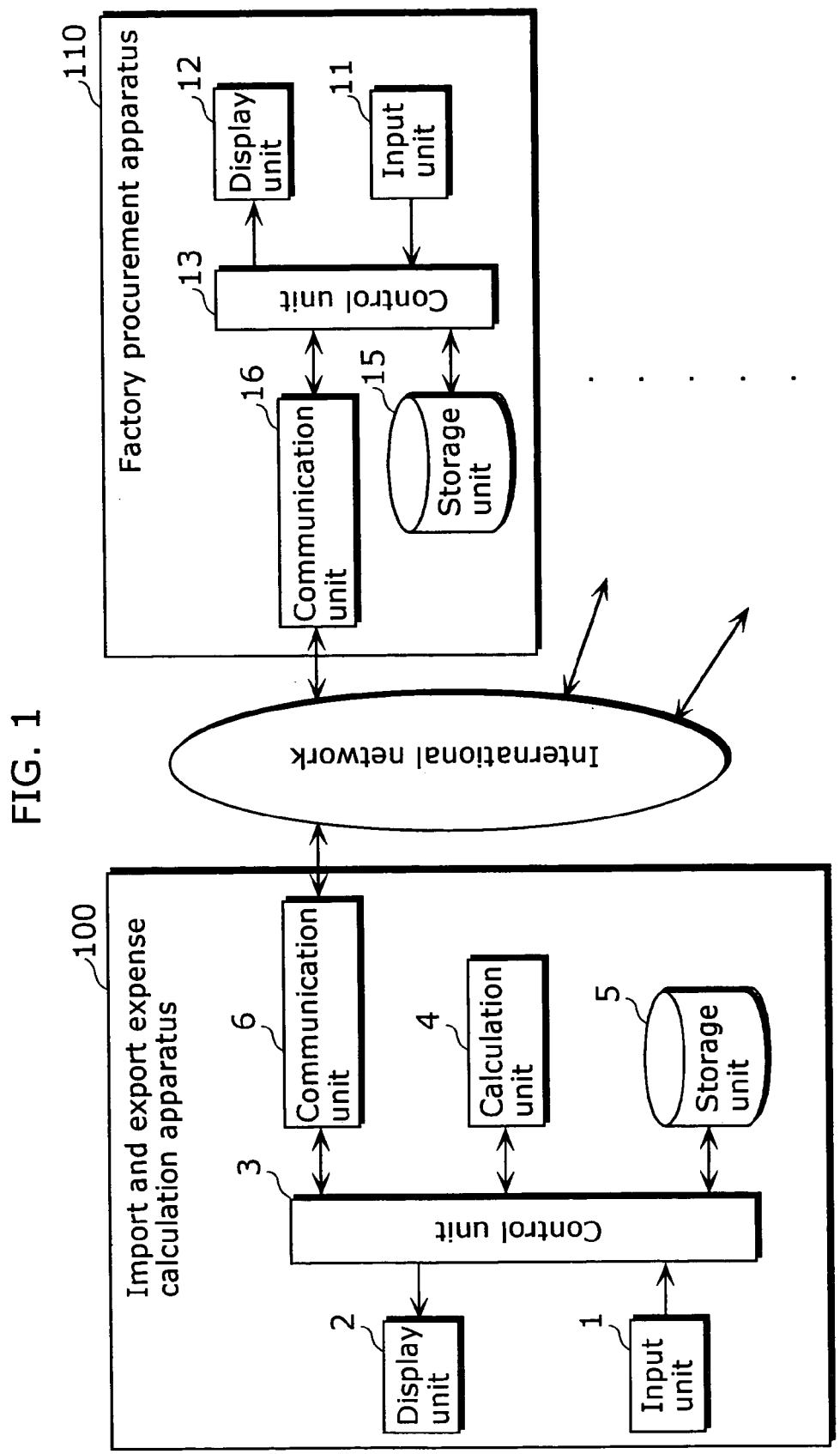
FIG. 1 is a diagram showing the basic block diagram of the import and export expense calculation apparatus and a central contracting assistance system in the first embodiment.

FIG. 1 is a diagram showing the basic block diagram of an import and export expense calculation apparatus and a central contracting assistance system, in the first embodiment of the present invention.

The central contracting assistance system is configured from one import and export expense calculation apparatus 100, and one or more units of a factory procurement apparatus 110 located worldwide, and connected via an international network.

The import and export expense calculation apparatus 100 includes: an input unit 1 on which a user inputs various required data for the purchase of material from respective international procurement locations; a display unit 2 for displaying to a customer, various data such as a calculation result; a calculation unit 4 for calculating various data, and so on; a storage unit 5 for storing various data; a control unit 3 for writing various data into the storage unit 5, reading-out various data from the storage unit 5, and controlling the respective units; and a communication unit 6 for communicating with the factory procurement apparatus 110 of each factory, and the like, via the international network.

The factory procurement apparatus 110 is an apparatus that receives, from the import and export expense calculation apparatus 100, information on a material procurement source selected by the user, and places an order for the material to the procurement source. The factory procurement apparatus 110 is connected to the import and export expense calculation apparatus 100 via the international network, and includes: an input unit 11 on which the user inputs various data; a display unit 12 for displaying various data to the user; a storage unit 15 for storing various data; a control unit 13 for writing various data into the storage unit 15, reading-out various data from the storage unit 15, and controlling the respective units; and a communication unit 16 for communicating with the import and export expense calculation apparatus 100, via the international network. In addition, it is possible for the import and export expense calculation apparatus 100 to be connected to a plurality of factory procurement apparatuses 110.

Figure 2:
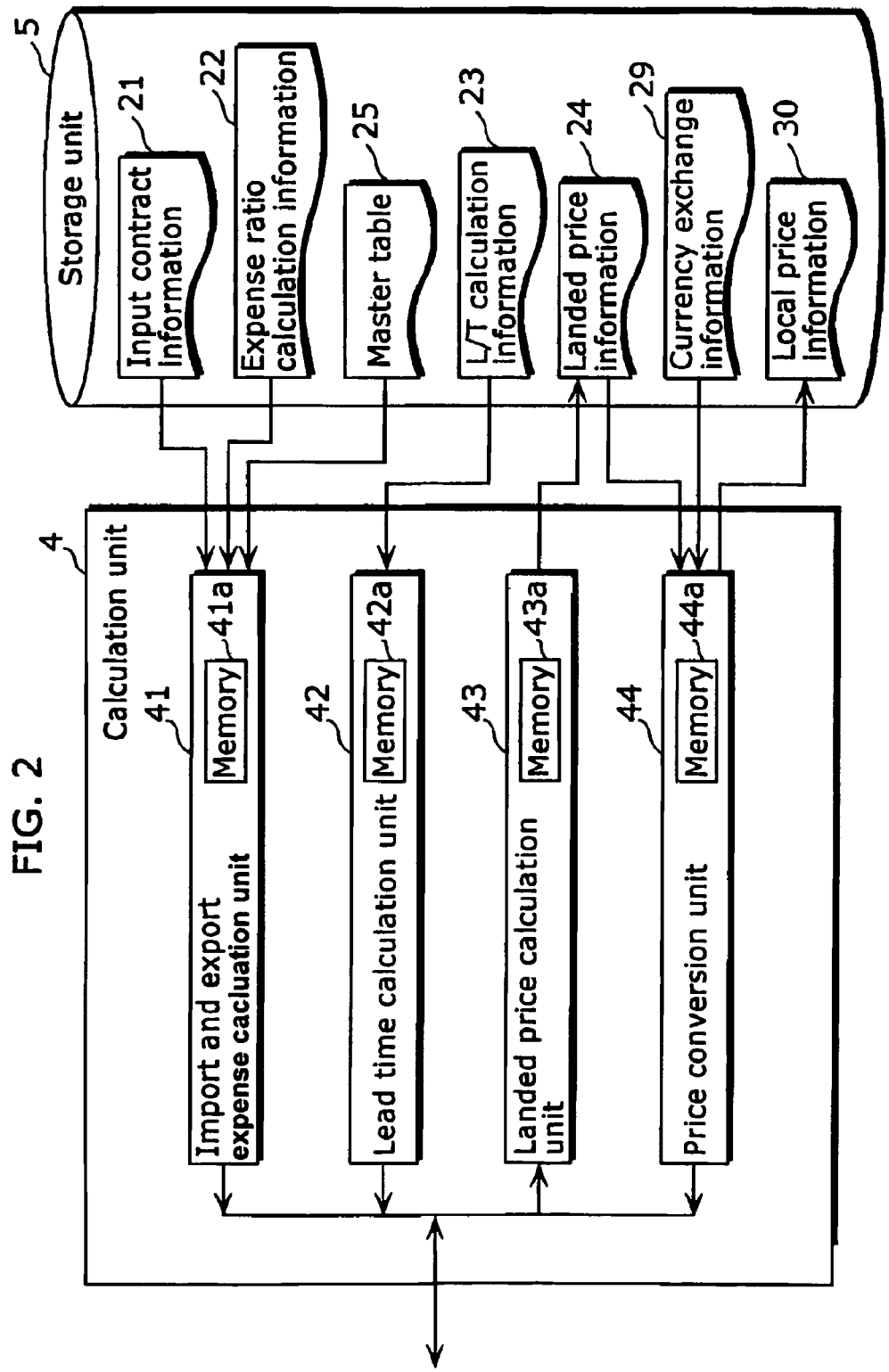
FIG. 2 is a block diagram showing a part of the functions of the import and export expense calculation apparatus in the first embodiment.

FIG. 2 is a block diagram showing a part of the functions of the import and export expense calculation apparatus in the first embodiment of the present invention. Functionally, the calculation unit 4 includes an import and export expense calculation unit 41, a lead time calculation unit 42, a landed price calculation unit 43, and a price conversion unit 44.

The import and export expense calculation unit 41 obtains input contract information 21, expense ratio calculation information 22, and a master table 25, stored in the storage unit 5, and calculates an import and export expense ratio. The import and export expense calculation unit 41 includes a memory 41a for storing obtained information and calculation results. The lead time calculation unit 42 obtains lead time (L/T) calculation information 23 is stored in the storage unit 5, and calculates a lead time (L/T) for the material. The lead time calculation unit 42 includes a memory 42a for storing the obtained information and the calculated result.

The landed price calculation unit 43 obtains the import and export expense ratio calculated by the import and export expense calculation unit 41, and using such, calculates a landed price. The calculated landed price is stored in the storage unit 5 as landed price information 24. The landed price calculation unit 43 includes a memory 43a for storing the obtained information and the calculation result. The price conversion unit 44 obtains the landed price information 24 and currency exchange information 29, stored in the storage unit 5, and performs, for example, a yen conversion of a local price, based on the currency exchange rate for the currency of the procurement country and the yen. The calculated local price is stored in the storage unit 5 as local price information 30. The price conversion unit 44 includes a memory 44a for storing the obtained information and the calculated result.

Figure 3:
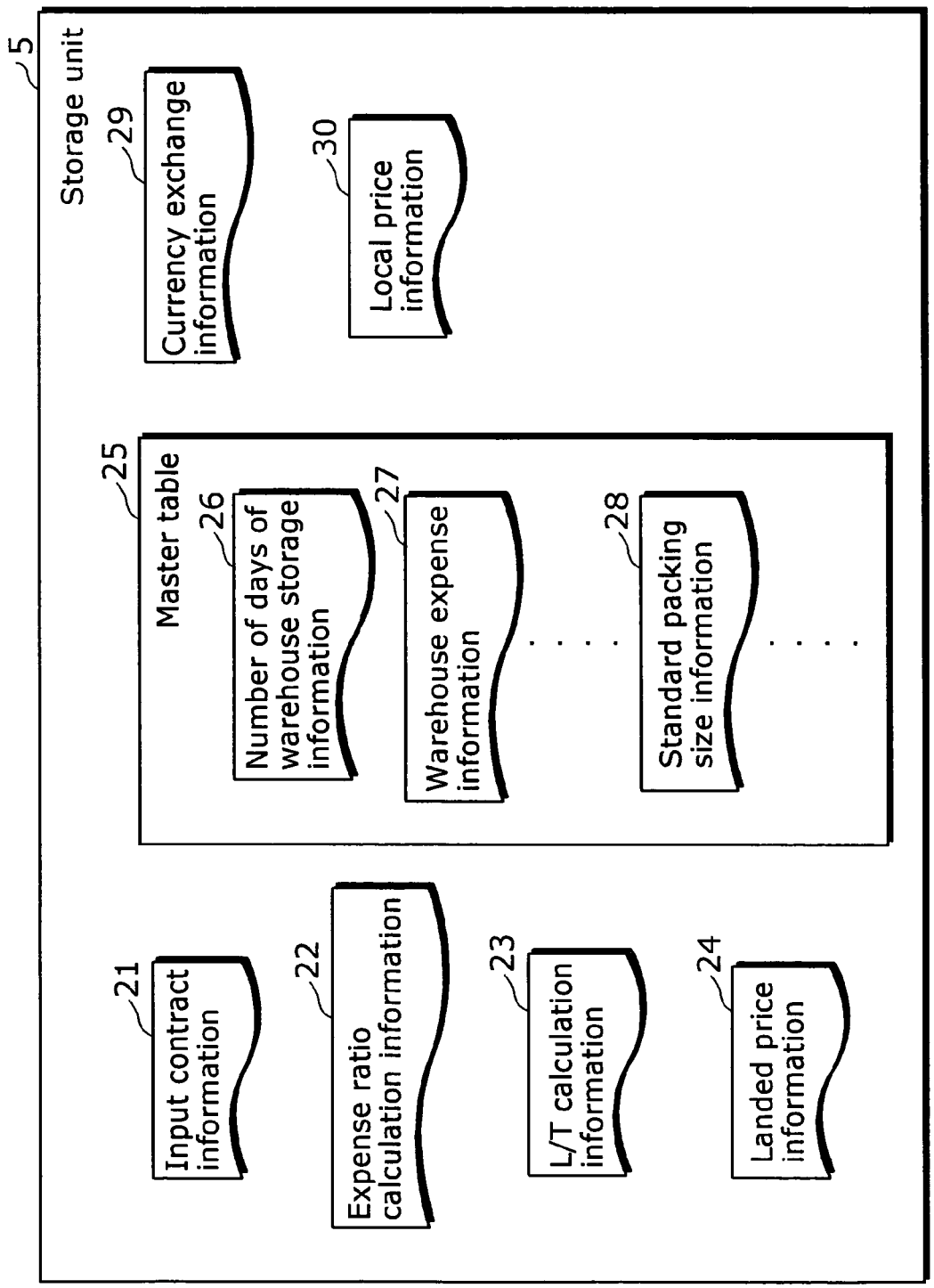
FIG. 3 is a diagram showing the stored data of the import and export expense calculation apparatus in the first embodiment.

FIG. 3 is a diagram showing the stored data of the import and export expense calculation apparatus 100 in the first embodiment of the present invention. The following are stored in the storage unit 5 of the import and export expense calculation apparatus 100: the input contract information 21 which is data of various input conditions for the purchase of the material; the expense ratio calculation information 22 which is logic information for calculating the import and export expense during the import and export of the material; the lead time (L/T) calculation information 23 which is information relating to the number of days it takes from the order placement up to the delivery of the material; the LANDED price information 24 which is landed price information in which the local price of the material is added with the import and export expense; the master table 25 which includes various entry data for calculating the import and export expense (e.g., number of days of warehouse storage information 26, warehouse expense information 27, standard packing size information 28, and so on); currency exchange information 29 which is the currency exchange rate information for the currency of the respective procurement countries and, for example, the yen; and the local price information 30 which is the price information of the respective materials at the respective procurement countries, and so on.

FIG. 4 is a diagram showing the input contract information of the import and export expense calculation apparatus in the first embodiment of the present invention. The following data regarding the international procurement of the material are input by the user and stored: part number, category, contract currency, contract purchase (FOR) unit price; effectivity period 1 (start date for domestic effectivity); procurement lead time (L/T); packing unit; final packing; procurement location; exporter; export classification (shipment, in other words, AIR or BOAT); and effectivity period 2 (effectivity date of the price overseas), and so on.

FIG. 5 and FIG. 6 are diagrams showing examples of information in the master table 25.

FIG. 5 is a diagram showing the standard packing size information for the international procurement of respective materials. Values of respective volume unit prices are stored by categories such as transistor, E-CAP, diode, chip resistor, chip CAPA, and IC.

FIG. 6A is a diagram showing number of days of procurement warehouse storage information. Respective number of days of procurement warehouse storage data is stored according to the respective procurement countries (Japan, Hong Kong, Malaysia, Singapore). Furthermore, FIG. 6B is a diagram showing warehouse expense information. Respective warehouse expense data is stored as percentages (%), on a per volume unit price basis (under 1 million yen, 1 million to under 10 million yen, 10 million to under is 50 million yen, 50 million to 100 million yen), and according to the respective countries.

Moreover, although not shown in the diagram, the export expense, FREIGHT (transportation expense), and the import expense, in the master table 25 are each stored according to AIR (air freight) and BOAT (sea freight) classifications.

FIG. 7 is a diagram showing the import and export expense ratio calculation information of the import and export expense calculation apparatus in the first embodiment of the present invention. The information stores the respective calculation logic and calculation results for the following: export warehouse expense; export margin; export interest; export expense; and "SUB-TTL 1" which is a subtotal up to this point; FREIGHT (transportation expense); marine insurance; and "SUB-TTL 2" which is a subtotal up to this point; import expense; SP (stock point) warehouse expense; SP transportation expense; import interest; import margin; and "TTL" which is the total for all the above entries. SUB-TTL 1 is used for calculating FOB (exporting country shipping price), SUB-TTL 2 is used for calculating CIF (shipping and insurance inclusive price), and TTL is used for calculating the LANDED price. In addition, the diagram also shows an example of which data in the master table is referred to for each entry, the calculation logic using such data, and the value of the calculation result.

Moreover, as shown in the calculation logic column, the export warehouse expense is calculated as "number of days of procurement warehouse storage"/10×"warehouse expense (1 period=10 days)", export interest is calculated as "number of days of interest advance by exporter"/30×"interest (rate/month)", SP (stock point) warehouse expense is calculated as "number of days of SP warehouse storage"/10×"warehouse expense (1 period=10 days)", and export interest is calculated as "number of days of interest advance by importer"/30× "interest (rate/month)". Values for other entries can be obtained by referring directly to the corresponding tables in the master table.

FIG. 8 is a diagram showing per-location L/T calculation information of the import and export expense calculation apparatus in the first embodiment of the present invention. The respective number of days for procurement L/T (number of days advanced booking in Japan), parts procurement L/T without logistic L/T (number of days of procurement warehouse storage), distribution L/T (customs lead time), and SP warehouse (number of days of SP warehouse storage) are stored. Furthermore, the value for distribution L/T is stored according to AIR and BOAT classifications. The total number of days for all the entries is calculated and stored as per-location L/T.

FIG. 9 is a diagram showing per-location LANDED price information of the import and export expense calculation apparatus in the first embodiment of the present invention. The values for FOB (exporting country shipping price), CIF (shipping and insurance inclusive price), LANDED price, and the total are stored on a per-factory (A-factory, B-factory, C-factory) basis.

Figure 10:
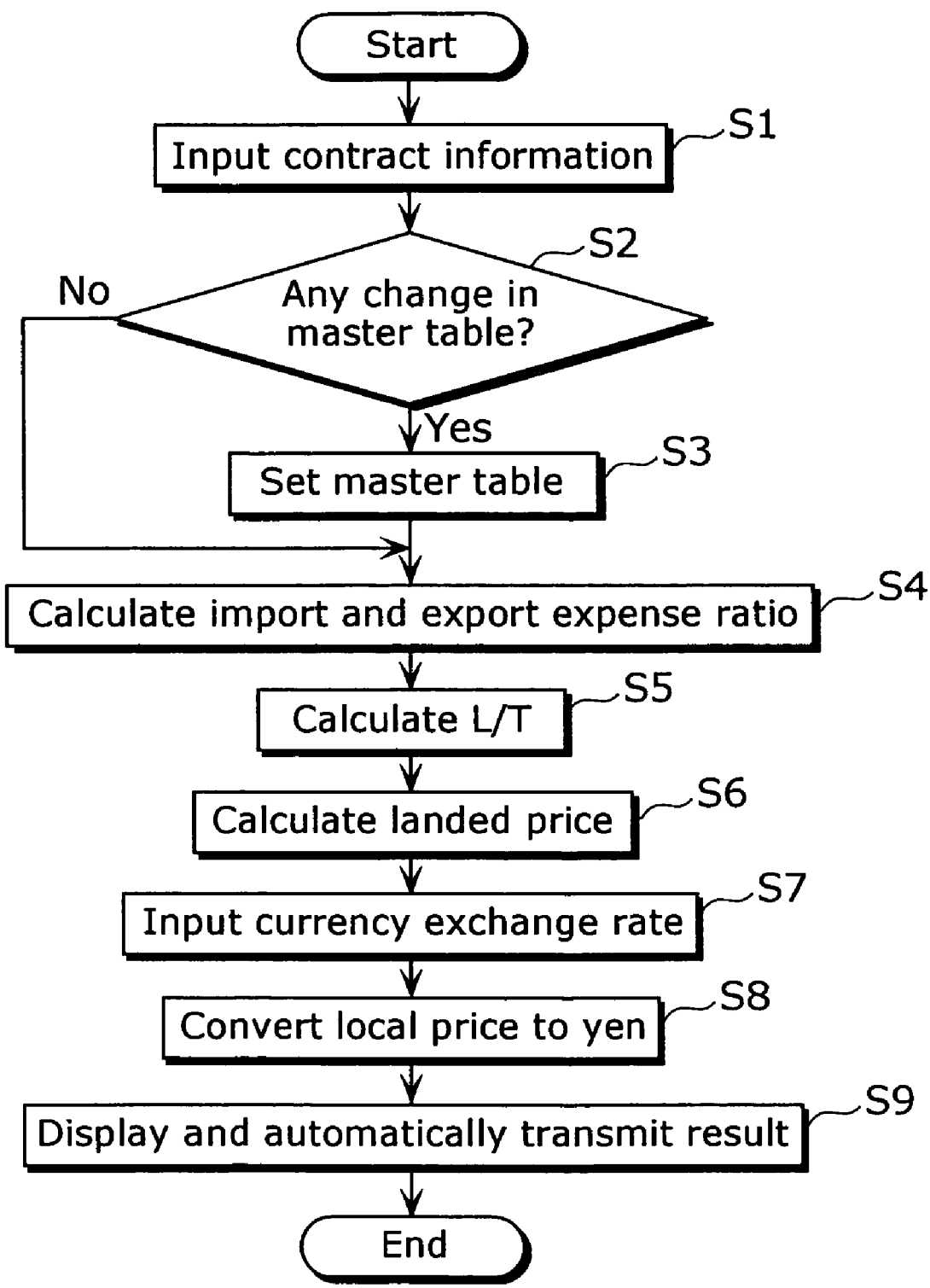
FIG. 10 is a diagram showing an outline flowchart for the import and export expense calculation apparatus in the first embodiment.

FIG. 10 is a diagram showing an outline flowchart for the import and export expense calculation apparatus in the first embodiment of the present invention.

First, the respective contract information for carrying out the international procurement of the material is input (S1). Next, when there is a change in the contents of the master table, which is basic data for calculating the various export and import expenses of the material (yes, in S2), setting (changing) of the data within the master table is performed (S3). When there is no change in the contents of the master table (no, in S2), such setting of the master table is skipped. Next, the import and export expense is calculated based on the input information of the various contract information and the master table (S4). Subsequently, the lead time (L/T) for is the material is calculated (S5). Next, the LANDED price is calculated (S6). Next, the currency exchange rates for the currency of the procurement countries and the yen, for example, are input (S7), and the local price is converted into yen, for example, using such currency exchange rates (S8). Finally, the respective calculation results are displayed on-screen on the display unit 2, and automatically transmitted to the contracting apparatus of the respective factories, via the international network (S9).

Figure 11:
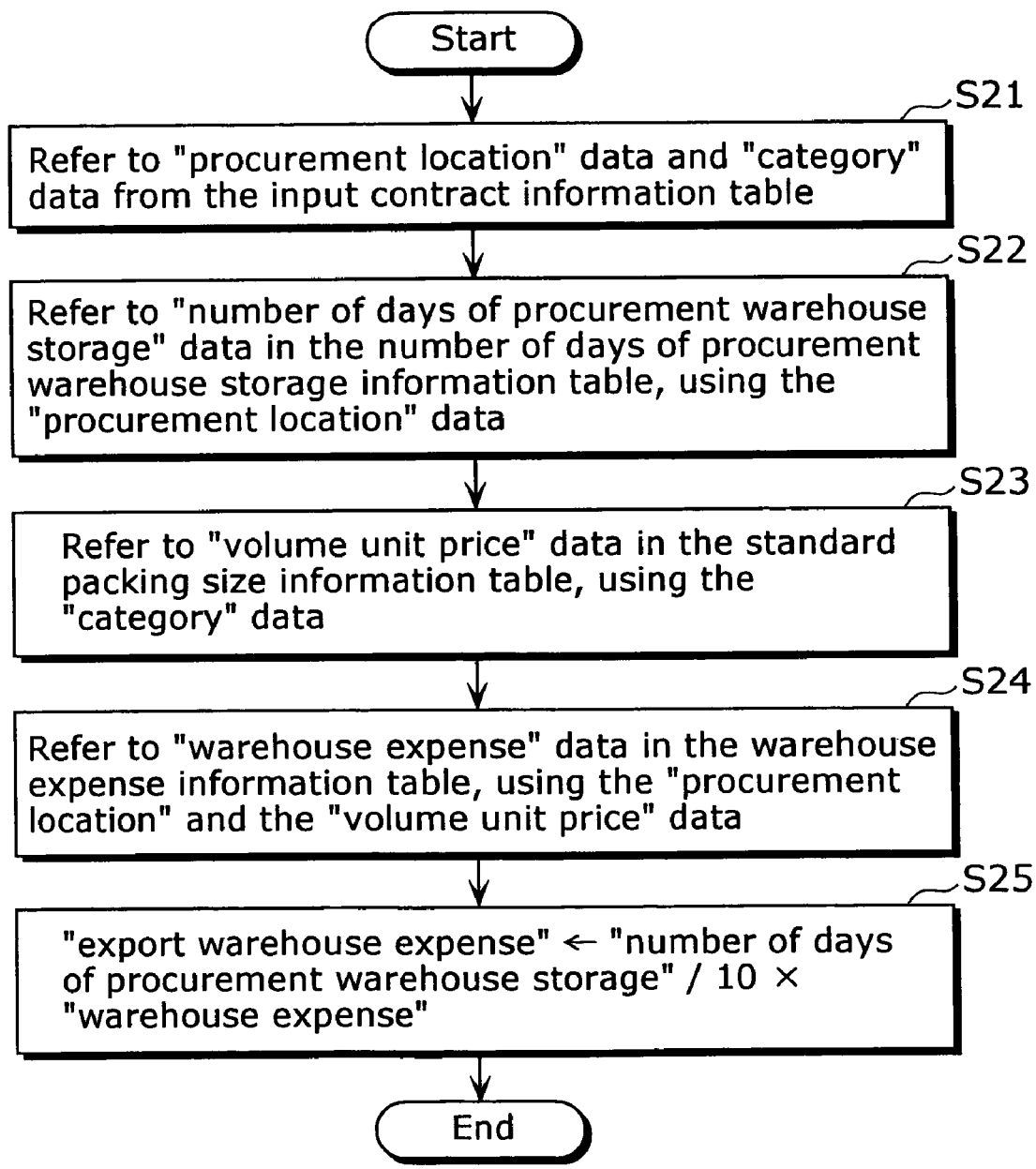
FIG. 11 is a diagram showing an export warehouse expense calculation flowchart for the import and export expense calculation apparatus in the first embodiment.

FIG. 11 is a diagram showing an export warehouse expense calculation flowchart for the import and export expense calculation apparatus in the first embodiment of the present invention. As explained in FIGS. 4 to 6, first, "procurement location" data and "category" data are referred to from the input contract information (S21). Next, based on the "procurement location" data, the "number of days of procurement warehouse storage" is referred to in the number of days of procurement warehouse storage information table (S22). Next, based on the "category" data, the "volume unit price" is referred to in the standard packing size information table (S23). Next, based on the "procurement location" data and the "volume unit price" data, the "warehouse expense" is referred to in the warehouse expense information table (S24). Finally, "number of days of procurement warehouse storage"/10× "warehouse expense" is taken as the "export warehouse expense" (S25). Moreover, the 10 (days) in this calculation formula is equivalent to the number of days for 1 period.

Figure 12:
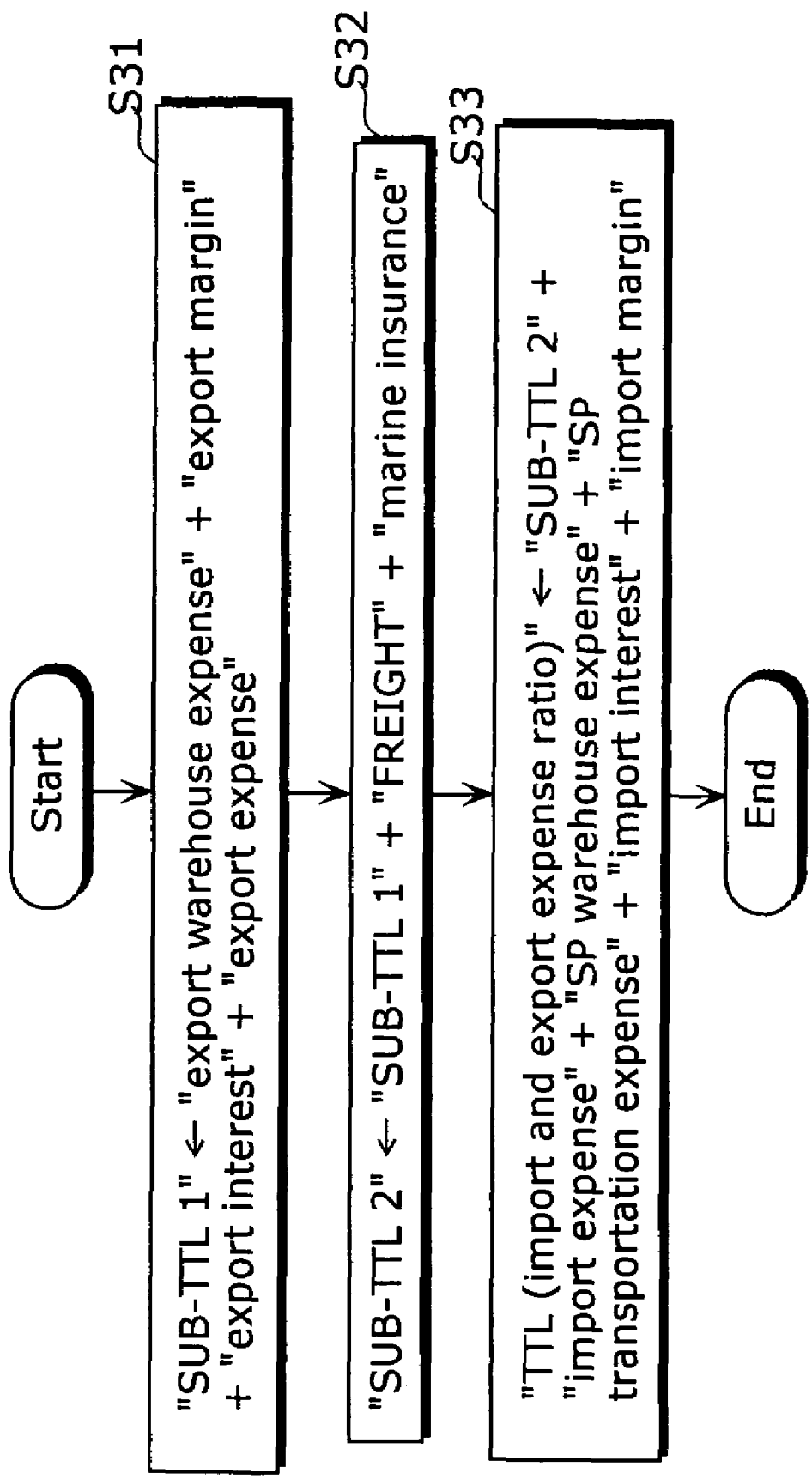
FIG. 12 is a diagram showing an import and export expense ratio calculation flowchart for the import and export expense calculation apparatus in the first embodiment.

FIG. 12 is a diagram showing an import and export expense ratio calculation flowchart for the import and export expense calculation apparatus in the first embodiment of the present invention. As explained in FIG. 7, first, the export warehouse expense, export margin, export interest, and export expense are respectively calculated or referred to, and the value of the sum of the above costs is taken as the "SUB-TTL 1" (S31). Next, FREIGHT and marine insurance are respectively referred to and added to the "SUB-TTL1", and the value of the sum thereof is taken as the "SUB-TTL 2" (S32). Subsequently, the export expense, SP warehouse expense, SP transportation expense, import interest, and import margin are respectively calculated or referred to, then added to the "SUB-TTL 2", and the value of the sum of all of the above costs is taken as the "TTL (import and export expense ratio)" (S33).

Figure 13:
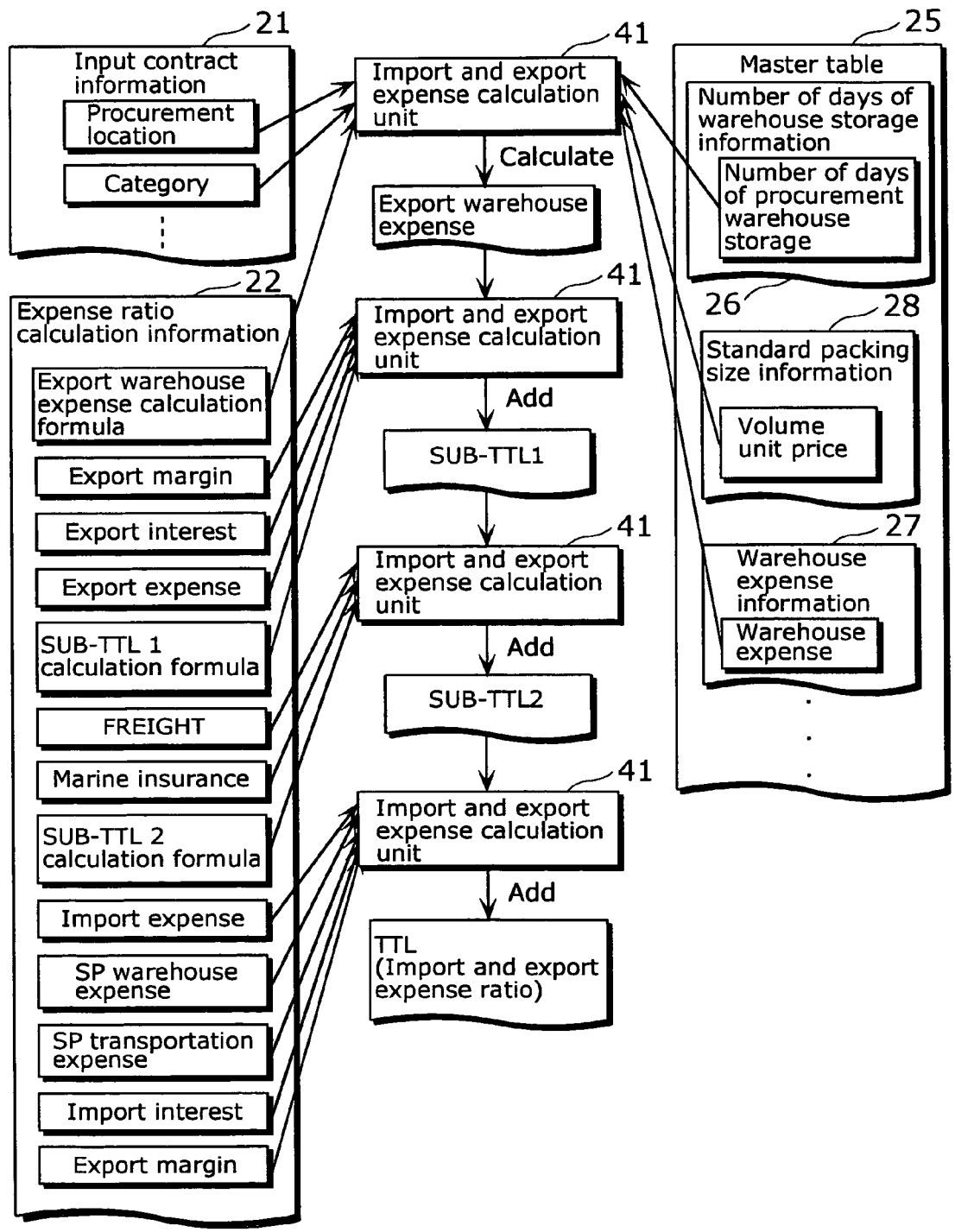
FIG. 13 is a diagram showing the operational procedure of import and export expense calculation unit 41.

The details described using FIG. 11 and FIG. 12 shall be explained once more using FIG. 13 which shows an operational procedure of the import and export expense calculation unit 41.

The import and export expense calculation unit 41 obtains the "procurement location" data and the "category" data within the input contract information 21, and stores these in the memory 41a. The import and export expense calculation unit 41 obtains, from within the number of days of procurement warehouse storage information table in the number of days of procurement warehouse storage information 26 within the master table 25, the "number of days of procurement warehouse storage" data corresponding to the "procurement location" data stored in the memory 41a, and stores this in the memory 41a. The import and export expense calculation unit 41 obtains, from the standard packing size information table in the standard packing size information 28 of the master table 25, the "volume unit price" data corresponding to the "category" data stored in the memory 41a, and stores this in the memory 41a. The import and export expense calculation unit 41 obtains, from the warehouse expense information table in the warehouse expense information 27 of the master table 25, the "warehouse expense" data corresponding to the "procurement location" data and the "volume unit price" data stored in the memory 41a, and stores this in the memory 41a. The import and export expense calculation unit 41 obtains, from the expense ratio calculation information 22, a is formula for calculating the "export warehouse expense", and stores this in the memory 41a. Subsequently, following the stored formula, the import and export expense calculation unit 41 obtains the "export warehouse expense" data by calculating the "number of days of procurement warehouse storage"/10× "warehouse expense", and stores this in the memory 41a.

Next, the import and export expense calculation unit 41 obtains, from the expense ratio calculation information 22, the "export margin" data, the "export interest" data, the "export expense" data, and the formula for calculating the "SUB-TTL 1", and stores these in the memory 41a. Following the stored formula for calculating the "SUB-TTL 1", the import and export expense calculation unit 41 obtains the "SUB-TTL 1" by adding up the "export warehouse expense" data, the "export margin" data, the "export interest" data, and the "export expense" data, stored in the memory 41a, and stores this in the memory 41a.

Next, the import and export expense calculation unit 41 obtains, from the expense ratio calculation information 22, the "FREIGHT" data, the "marine insurance" data, and a formula for calculating the "SUB-TTL 2", and stores these in the memory 41a. Following the stored formula for calculating the "SUB-TTL 2", the import and export expense calculation unit 41 obtains the "SUB-TTL 2" by adding up the "SUB-TTL 1", the "FREIGHT" data, and the "marine insurance" data, stored in the memory 41a, and stores this in the memory 41a.

Next, using the expense ratio calculation information 22, the import and export expense calculation unit 41 obtains or calculates the "import expense" data, the "SP warehouse expense" data, the "SP transportation expense" data, the "import interest" data, and the "import margin" data, and stores these in the memory 41a. The import and export expense calculation unit 41 obtains the "TTL (import and export expense ratio)" by adding the "SUB-TTL 2", the "import expense" data, the "SP warehouse expense" data, the "SP transportation expense" data, the "import interest" data, and the "import margin" data, stored in the memory 41a, and stores this in the memory 41a.

It should be noted that the various expenses explained above are all expressed as percentage (%) data, and, by multiplying the price of one unit of the material by such percentage, a price which is inclusive of such expense is obtained.

Figure 14:
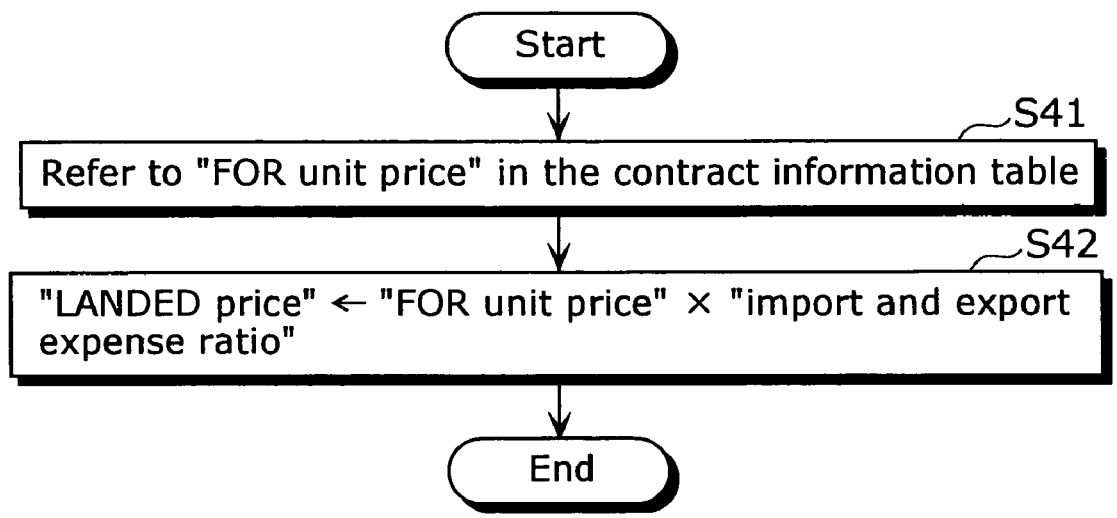
FIG. 14 is a diagram showing a LANDED price calculation flowchart of the import and export expense calculation apparatus in the first embodiment.

FIG. 14 is a diagram showing a LANDED price calculation flowchart of the import and export expense calculation apparatus 100 in the first embodiment of the present invention. First, the "FOR unit price" which is the local price at the procurement source country, is referred to in the contract information table (S41). Next, using the previously calculated "export and import expense ratio", "FOR unit price"×"import and export expense ratio" is calculated, and the result is taken as the "LANDED price" which is the landed price at the importing-side (S42).

Figure 15:
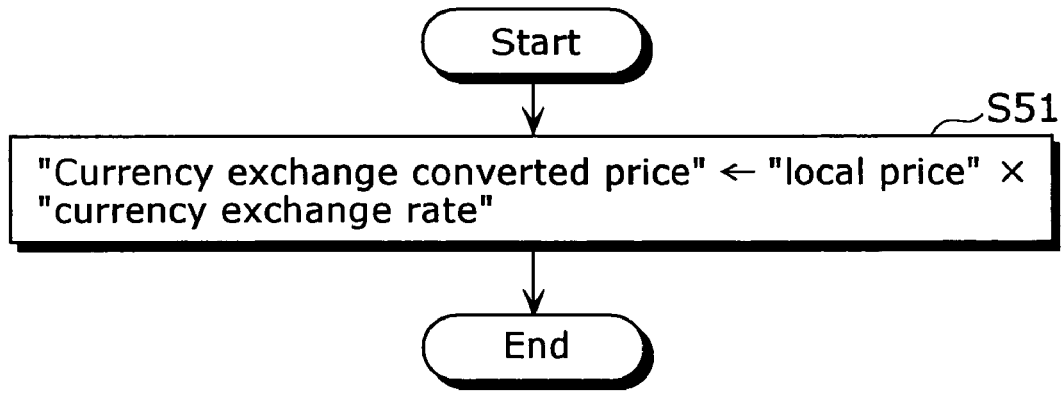
FIG. 15 is a diagram showing a currency exchange converted price calculation flowchart for the import and export expense calculation apparatus in the first embodiment.

FIG. 15 is a diagram showing a currency exchange converted price calculation flowchart for the import and export expense calculation apparatus in the first embodiment of the present invention. Based on the "local price" of the material at the country of the importing-side, "local price"×"(local currency to yen) currency exchange rate" is calculated, and by taking the result as the "currency exchange converted price", all the currency units for the local prices are uniformly indicated in yen, for example, (S51). With this, price comparisons of the price when purchasing domestically without importing, and the LANDED prices when purchasing from procurement sources in respective countries worldwide, with import and export being carried out, become easier for the user, and the easy determination of an optimal procurement source for materials becomes possible.

FIG. 16 is a diagram showing an example of the import and export expense master register screen of the import and export expense calculation apparatus in the first embodiment of the present invention. On the export/import expense master registration screen in screen sample in FIG. 16, registration, changing, and deletion, of a number of days of procurement warehouse storage master is performed. By pressing a "search" button, all data registered in the number of days of procurement warehouse storage master is searched, and the search result is displayed in a table window. By pressing an "add" button, an additional line is inserted in the table window, and the input of new data can be received. By pressing a "delete" button, deletion can be carried out on the selected line in the table window. By pressing an "update" button, input information is registered into the number of days of procurement warehouse storage master.

Aside from this, the import/export expense master register is provided with respective register screens for registrations concerning export warehouse expense, export margin, export interest, export expense, FREIGHT, marine insurance, import expense, SP warehouse expense, SP transportation expense, import interest, import margin, number of days of interest advance by exporter, number of days of interest advance by importer, customs lead time, import and export country, stock point, standard packing size, currency exchange rate, and so on (illustration is omitted). The display for each registration screen is the same as the display explained previously, and in addition, searching, adding, deleting, updating, and so on, can be performed in the same manner.

Figure 17:
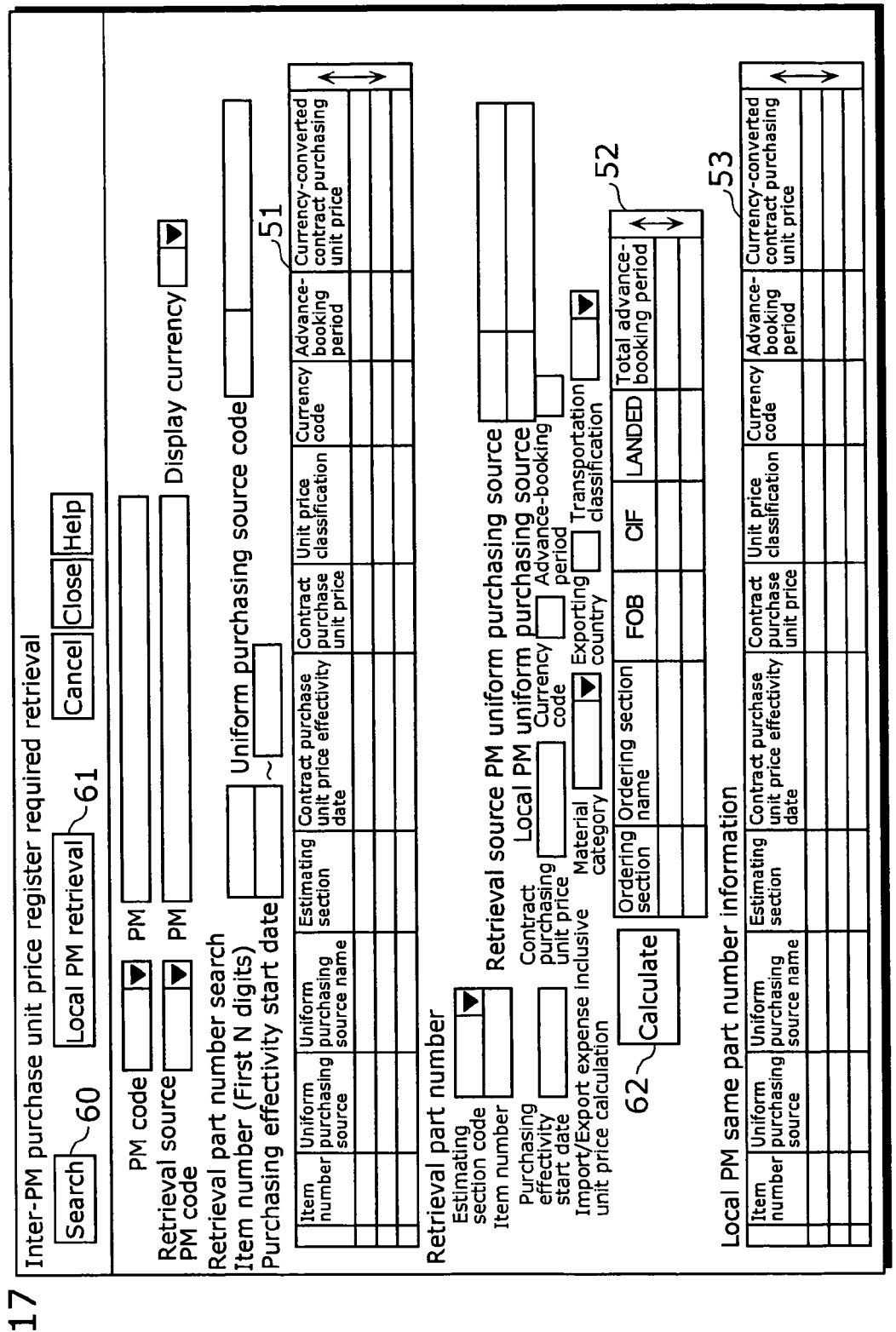
FIG. 17 is a diagram showing the import and export purchase unit price display screen of the import and export expense calculation apparatus in the first embodiment.

FIG. 17 is a diagram showing an example of the import and export purchase unit price display screen of the import and export expense calculation apparatus in the first embodiment of the present invention.

By pressing a "search" button 60 after inputting a retrieval source PM (Parts Master) code and a retrieval part number search condition, registered required data within the retrieval source PM, falling under the search condition, is displayed in a table window 51. By selecting a part number displayed in the table window 51, the PM (Parts Master) unit price information of such part number is set in the retrieval part number column. Furthermore, a search within a local-PM is conducted using the item number of the selected part number, and relevant registered required data is displayed in a table window 53.

By pressing a "calculate" button 62, the import and export expense, corresponding to the part number set in the retrieval part number column, is calculated, FOB, CIF, and LANDED price are respectively calculated, and the results shown in a table window 52. Furthermore, with regard to lead time, a total advanced booking period in which the customs lead time, and so on, are added up, is calculated and displayed in the table window 52.

By pressing a "local-PM retrieval" button 61, the PM unit price information set in the retrieval part number column is added into the table window 51 of the purchase unit price registration request input screen of table window 51. Furthermore, the contract purchase unit price in the table window 51, FOB, CIF, and LANDED price in the table window 52, and the contract purchase unit price in the table window 53, are respectively performed including a currency exchange conversion and displayed in a display currency designated by the user.

Hereinafter, the operation of the import and export expense calculation apparatus explained up to this point shall be shown using a specific example. As "transistor" is input as the category in the contract information input example in FIG. 4, the volume unit price in the standard packing size information in FIG. 5, corresponding to "transistor" is referred to, and a value "0.9" is retrieved. Furthermore, as "Japan" is input as the procurement location in FIG. 4, a value "10" in the number of days of procurement warehouse storage table in FIG. 6A, is retrieved. Moreover, as the procurement location in FIG. 4 is "Japan" and the volume unit price in FIG. 5 is "0.9", a value "2%" stored in the corresponding portion of the warehouse expense table in FIG. 6B, is retrieved. Accordingly, a value "2.000%" is stored in the column for the export warehouse expense in FIG. 7. With regard to the other expense ratio entries shown in FIG. 7, respective values are also calculated through the same method, using the calculation logic in FIG. 7, and stored. As a result, in this example, the SUB-TTL 1 shows a value "7.000%", SUB-TTL 2 shows a value "13.000%", and TTL shows a value "23.000". Furthermore, as shown in FIG. 8, in this example, a value "60 days" is obtained as the per-location L/T by totaling the respective lead times. Finally, as shown in FIG. 9, the values for FOB, CIF, and LANDED price, are respectively obtained using the respective values of the value "10" for the FOR unit price in FIG. 4, and SUB-TTL 1, SUB-TTL 2, and TTL in FIG. 7, and stored.

As explained up to this point, by using the import and export expense calculation apparatus in the present invention, it is possible to accurately calculate, from the local prices of the material at the respective procurement locations, the respective LANDED prices which include overhead expenses required during import and export, and the local price of the same material at the importing-side, and compare these. Therefore, it is possible to procure from the lowest costing location among the procurement sources worldwide.

Furthermore, aside from a cost comparison of materials, it can also assist the determination, by the user, of an optimal material procurement source with consideration to lead time.

In addition, aside from cutting costs in the procurement of materials in a global production framework, the speeding-up of material procurement, and the strengthening of coordination between the respective locations through the automatic transmission of the calculation results to the respective procurement locations, also becomes possible.

Moreover, it is obvious that it is also possible to emphasize the lowest among the currency exchange converted prices of the respective LANDED prices and domestic procurements, so that it is easily recognizable to the user (for example, by highlight display, blinking display, bold face display, colored display, and so on). Furthermore, although explanation is carried out with the respective prices being compared by being converted into yen, for example, it is obvious that it is also possible to standardize the currencies by conversion into another currency aside from the yen.

Figure 18:
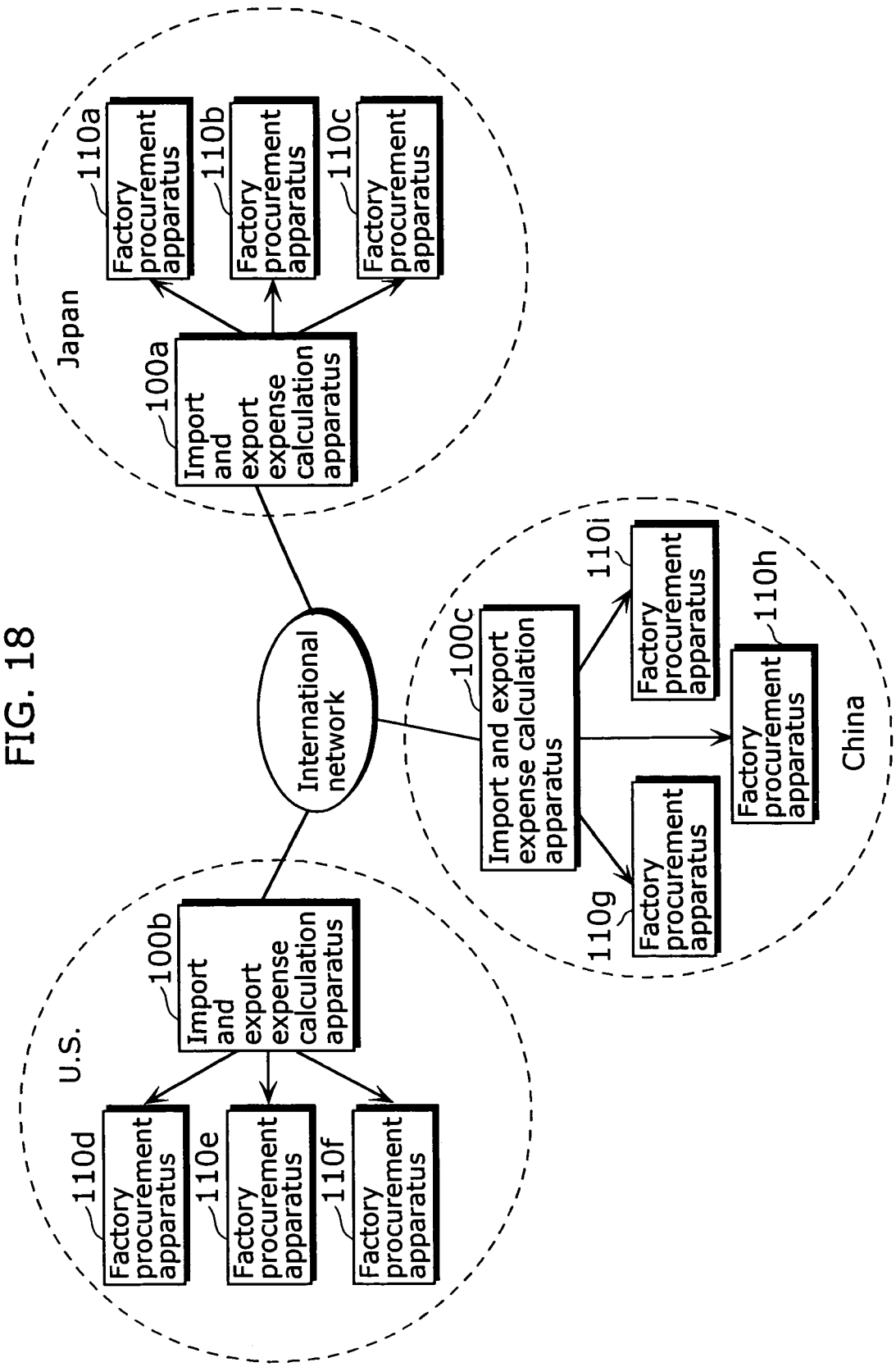
FIG. 18 is a configuration diagram of a system that includes the import and export expense calculation apparatus 100 and the factory procurement apparatus 110, in the first embodiment.

Furthermore, the import and export expense calculation apparatus 100 and the factory procurement apparatus 110 can also make up a system, as shown in FIG. 18, which assists a user that attempts to procure materials internationally. FIG. 18 shows a situation where an import and export expense calculation apparatus 100 is located in Japan, the United States, and China, and where the import and export expense calculation apparatus 100 in the respective countries are connected, via an international network, so as to make communication possible. In addition, each import and export expense calculation apparatus 100 in the respective countries is connected to three factory procurement apparatuses 110, so as to make communication possible. Each factory procurement apparatus 110 is located in a different factory.

Using the input unit 1 of any of the import and export expense calculation apparatuses 100, a manager inputs the data to be stored in the memory unit 5 of all the import and export expense calculation apparatuses 100, and in addition, inputs new data required for updating. With this, data is stored, and furthermore, stored data is updated, in the memory unit 5 of the respective import and export expense calculation apparatuses 100.

In the system shown in FIG. 18, in the case where a user residing in Japan attempts to procure a material internationally, the user operates the import and export expense calculation apparatus 100 located in Japan. With this, the import and export expense calculation apparatus 100 located in Japan obtains the aforementioned material's landed cost from within Japan, the United States, and China, and displays the obtained results by country. By using the displayed contents, the user determines the optimal procurement source for the material.

When the procurement source is determined by the user, the import and export expense calculation apparatus 100 transmits information on the determined procurement source to any of the factory procurement apparatuses 110 in the country where the determined procurement source belongs. The factory procurement apparatus 110 receives the information on the procurement source, and places an order for the material to such procurement source.

Moreover, it is also possible to locate the import and export expense calculation apparatus 100 in only one of any of the countries. In this case, the factory procurement apparatuses 110 in the respective countries are connected to the single import and export expense calculation apparatus 100 via the international network, so as to make communication possible. In addition, it is also possible to have only one factory procurement apparatus 110 in each country.

Figure 19:
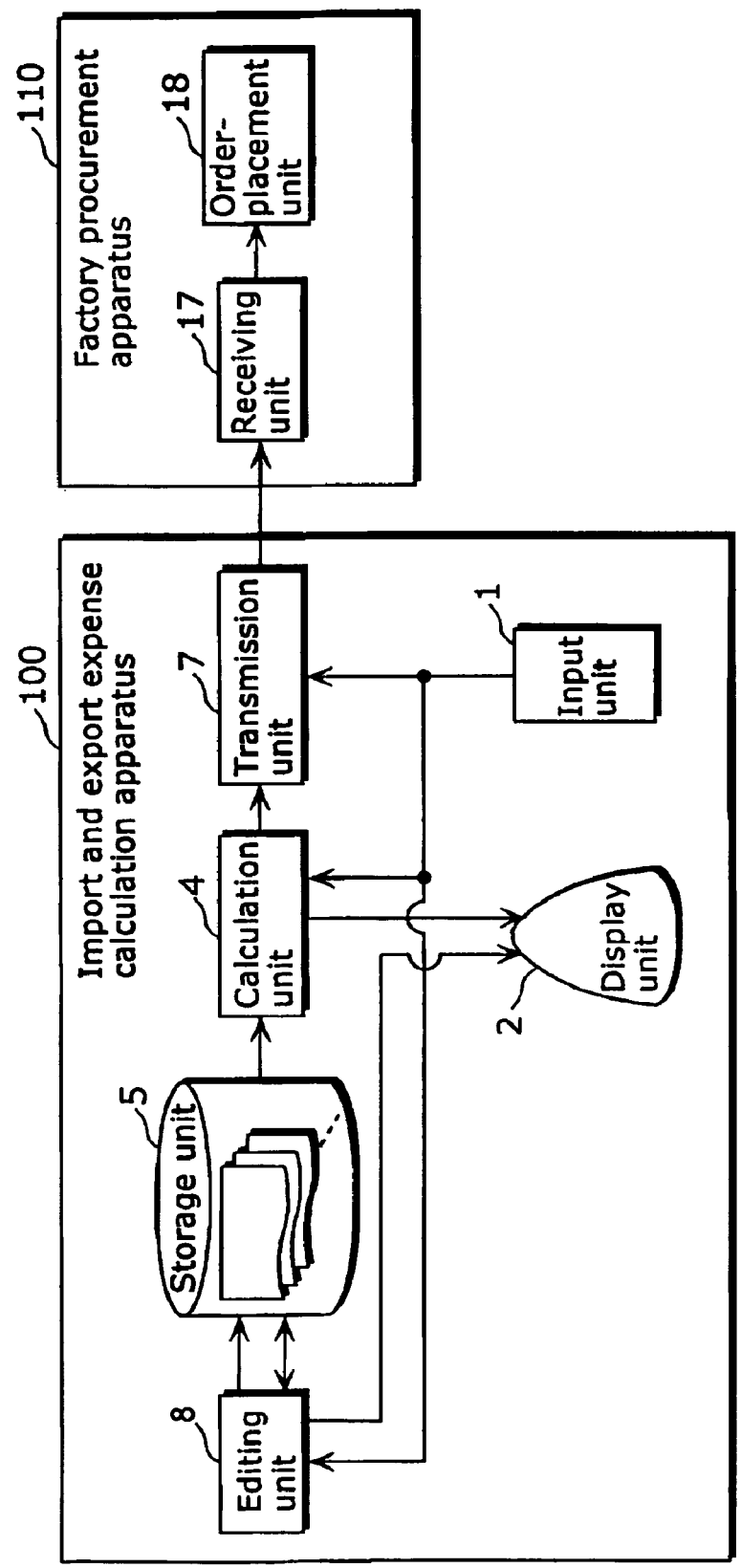
FIG. 19 is a diagram for explaining the functions of the import and export expense calculation apparatus 100 and the factory procurement apparatus 110, in the first embodiment.

Next, the explanation on the functions of the import and export expense calculation apparatus 100 and the factory procurement apparatus 110 shall be supplemented using FIG. 19. FIG. 19 is a diagram for explaining the functions of the import and export expense calculation apparatus 100 and the factory procurement apparatus 110.

An import and export expense calculation apparatus 100 includes an editing unit 8, a storage unit 5, a calculation unit 4, a display unit 2, an input unit 1, and a transmission unit 7. The editing unit 8 stores, into the storage unit 5, data input through the input unit 1, and in addition, updates the data stored in the storage unit 5. The editing unit 8 is connected to the display unit 2. The manager inputs data to be stored in the storage unit 5 while looking at the contents displayed on the display unit 2.

As previously explained, the calculation unit 4 calculates the landed prices by country, and the display unit 2 displays the calculated landed prices by country. The user looks at the displayed contents and determines the procurement source. When the determined items are input by the user through the input unit 1, the calculation unit 4 receives such determined item, and transmits information on the procurement source corresponding to such determined item, to the transmission unit 7. The transmission item 7 transmits, to the factory procurement apparatus 110 in the country to which such procurement source belongs, information indicating the determination of such procurement source.

The factory procurement apparatus 110 includes a receiving unit 17, and an order-placement unit 18. The reception unit 17 receives the information from the transmission unit 7, and the order-placement unit 18 places an order for the material to the procurement source determined by the user.

The import and export expense calculation apparatus according to the present invention, and the method thereof, can be applied in a materials optimal-location purchasing assistance apparatus, and the like, in a global production framework.

The invention claimed is:

1. An import and export expense calculation apparatus according for assisting international procurement of a material, said apparatus comprising:

a storage unit operable to store (i) a master table which stores basic import and export expense information, and (ii) a calculation table which stores import and export expense ratio calculation logic, the basic import and export expense information including entry data for use in calculating an import and export expense, and the import and export expense ratio calculation logic including logic for calculating, using the basic import and export expense information, an import and export expense ratio related to an import and export of one piece of material;

an input unit operable to receive contract information related to the material and a local price of the material at an exporting side;

an import and export expense ratio calculation unit operable to (i) obtain, from the master table, the basic import and export expense information corresponding to the received contract information, and (ii) calculate the import and export expense ratio according to the import and export expense calculation logic by using the obtained basic import and export expense information;

a landed price calculation unit operable to calculate a landed price by adding an import and export expense to the local price; and a display unit operable to display the landed price calculated by said landed price calculation unit, wherein the master table includes any of: standard packing size information; exporter information; importer; number of days of export warehouse storage; export warehouse expense information; export margin information; export interest information; number of days of interest advance by exporter; export expense information; transportation expense information; marine insurance information; import expense information; number of days of import warehouse storage; import warehouse expense information; import interest information; number of days of interest advance by importer; and import margin information, wherein the export warehouse expense information, the export margin information, the export interest information, the export expense information, the transportation expense information, the marine insurance information, the import expense information, the import warehouse expense information, the import interest information, and the import margin information are stored in the master table as percentage values on a per material basis, wherein the calculation table identifies entries included in the import and export expense ratio, wherein the entries include an entry corresponding to the basic import and export expense information and include an entry represented by a formula using the basic import and export expense information, wherein said import and export expense ratio calculation unit is operable to calculate, as the import and export expense ratio, a sum of respective percentage values of the following information stored in the master table: the export warehouse expense; the export margin; the export interest; the export expense; the transportation expense; the marine insurance; the import expense; the import warehouse expense; a stock point transportation expense; the import interest; and the import margin, and wherein said landed price calculation unit is operable to calculate the landed price using, as the import and export expense, a price obtained by multiplying the local price by the import and export expense ratio calculated by said import and export expense ratio calculation unit.

2. The import and export expense calculation apparatus according to claim 1, wherein the master table includes at least one of the following: standard packing size information; exporter information; importer information; number of days of export warehouse storage; export warehouse expense information; export margin information; export interest information; number of days of interest advance by exporter; export expense information; transportation expense information; marine insurance information; import expense information; number of days of import warehouse storage; import warehouse expense information; import interest information; number of days of interest advance by importer; and import margin information.

3. The import and export expense calculation apparatus according to claim 1, wherein:

lead time calculation information, which (i) indicates information on a number of days it takes from order placement to delivery of the material and (ii) is input via said input unit, is stored in said storage unit; and said import and export expense calculation apparatus further includes a lead time calculation unit operable to obtain the lead time calculation information and operable to calculate a lead time of the material.

4. The import and export expense calculation apparatus according to claim 3, wherein the lead time calculation information includes at least one of procurement lead time information, part procurement lead time information without logic lead time information, distribution lead time information, and storage lead time information.

5. The import and export expense calculation apparatus according to claim 1, wherein:

currency exchange rate information is stored in said storage unit; and said import and export expense calculation apparatus further comprises a price conversion unit operable to obtain the currency exchange rate information from said storage unit, and operable to standardize currency units of (i) a local price of the material at the importing-side and (ii) the landed price, based on the currency exchange rate information.

6. The import and export expense calculation apparatus according to claim 5, wherein said display unit is operable to simultaneously display the local price and the landed price according to the standardized currency units.

7. The import and export expense calculation apparatus according to claim 1, further comprising a communication unit operable to transmit the landed price to a purchase contracting apparatus from which a user makes a purchase contract for purchasing the material.

8. The import and export expense calculation apparatus according to claim 1, wherein:

the entry corresponding to the basic import and export expense information stored in the calculation table includes: the export margin information; the export expense information; the transportation expense information; the marine insurance information; the import expense information; the stock point transportation expense information; and the import margin information;

the entry represented by the formula using the basic import and export expense information stored in the calculation table includes: the export warehouse expense information; the export interest information; the import warehouse expense information; and the import interest information;

said import and export expense ratio calculation unit is operable to calculate, as the import and export expense ratio, a sum of respective percentage values of the entry corresponding to the basic import and export expense information and the entry represented by the formula using the basic import and export expense information; and said landed price calculation unit is operable to calculate the landed price by adding, to the local price, a price obtained by multiplying the local price by the import and export expense ratio calculated by said import and export expense ratio calculation unit.

9. The import and export calculation apparatus according to claim 8, wherein the master table includes:

a standard packing size information table for storing, for each category of the material, a volume unit-price corresponding to each respective category of the material;

a number-of-days-of-warehouse-storage information table for storing the number of days of warehouse storage, on a per country basis; and a warehouse expense table for storing, on a per volume unit-price and a per country basis, a warehouse expense corresponding to the volume unit-price, wherein the contract information received by said input unit includes:
a country in which a procurement base location is located; and
the category of the material, and
wherein said import and export expense ratio calculation unit is operable to:
retrieve, from the number-of-days-of-warehouse-storage information table, the number of days of warehouse storage corresponding to the country, in which the procurement base location is located, included in the contract information input through said input unit;
identify, from the standard packing size information table, a volume unit-price corresponding to the category of the material included in the contract information input through said input unit, and retrieve, from the warehouse expense table, a warehouse expense corresponding to the identified volume unit-price; and
calculate the export warehouse expense using the number-of-days-of-warehouse-storage, the warehouse expense, and a formula, stored in the calculation table, for calculating the export warehouse expense.

10. The import and export expense calculation apparatus according to claim 1, wherein said landed price calculation unit is operable to:
calculate an exporting country shipping price by adding the local price and a price obtained by multiplying the local price by a sum of respective percentage values of the export warehouse expense information, the export margin information, the export interest information, and the export expense information;
calculate a shipping and insurance inclusive price by adding the local price and a price obtained by multiplying the local price by a sum obtained by adding respective percentage values of the transportation expense information and the marine insurance information to a sum of respective percentage values used in calculating the exporting country shipping price; and
calculate the landed price by adding the local price and a price obtained by multiplying the local price by a sum obtained by adding respective percentage values of the import expense information, import warehouse expense information, and the import margin information to a sum of respective percentage values used in calculating the shipping and insurance inclusive price.

11. An import and export expense calculation method for assisting international procurement of a material, said method comprising:
storing (i) a master table which stores basic import and export expense information and (ii) a calculation table which stores import and export expense ratio calculation logic, the basic import and export expense information including entry data for use in calculating an import and export expense, and the import and export expense ratio calculation logic including logic for calculating, using the basic import and export expense information, an import and export expense ratio related to the import and export of one piece of material;
receiving contract information related to the material and a local price of the material at an exporting side;
obtaining, from the master table, the basic import and export information corresponding to the received contract information, and calculating the import and export expense ratio according to the import and export expense calculation logic by using the obtained basic import and export expense information;
calculating, using a computer processor, a landed price by adding an import and export expense to the local price; and
displaying the landed price calculated by said calculating of the landed price,
wherein the master table includes any of: standard packing size information; exporter information; importer; number of days of export warehouse storage; export warehouse expense information; export margin information; export interest information; number of days of interest advance by exporter; export expense information; transportation expense information; marine insurance information; import expense information; number of days of import warehouse storage; import warehouse expense information; import interest information; number of days of interest advance by importer; and import margin information,
wherein the export warehouse expense information, the export margin information, the export interest information, the export expense information, the transportation expense information, the marine insurance information, the import expense information, the import warehouse expense information, the import interest information, and the import margin information are stored in the master table as percentage values on a per material basis,
wherein the calculation table identifies entries included in the import and export expense ratio,
wherein the entries include an entry corresponding to the basic import export expense information, and an entry represented by a formula using the basic import and export expense information,
wherein in said calculating of the import and export expense ratio, the import and export expense ratio is calculated using a sum of respective percentage values of the following information stored in the master table: the export warehouse expense; the export margin; the export interest; the export expense; the transportation expense; the marine insurance; the import expense; the import warehouse expense; a stock point transportation expense; the import interest; and the import margin, and
wherein, in said calculating of the landed price, the landed price is calculated using, as the import and export expense, a price obtained by multiplying the local price by the import and export expense ratio calculated in said calculating of the import and export expense ratio.

12. A computer-readable storage medium having a computer program stored thereon, the computer program for assisting international procurement of a material, said computer program causing a computer to execute a method comprising:
storing (i) a master table which stores basic import and export expense information and (ii) a calculation table which stores import and export expense ratio calculation logic, the basic import and export expense information including entry data for use in calculating an import and export expense, and the import and export expense ratio calculation logic including logic for calculating, using the basic import and export expense information, an import and export expense ratio related to the import and export of one piece of material;
receiving contract information related to the material and a local price of the material at an exporting side;
obtaining, from the master table, the basic import and export information corresponding to the received contract information, and calculating the import and export expense ratio according to the import and export expense calculation logic by using the obtained basic import and export expense information;

calculating a landed price by adding an import and export expense to the local price; and displaying the landed price calculated by said calculating of the landed price, wherein the master table includes any of: standard packing size information; exporter information; importer; number of days of export warehouse storage; export warehouse expense information; export margin information; export interest information; number of days of interest advance by exporter; export expense information; transportation expense information; marine insurance information; import expense information; number of days of import warehouse storage; import warehouse expense information; import interest information; number of days of interest advance by importer; and import margin information, wherein the export warehouse expense information, the export margin information, the export interest information, the export expense information, the transportation expense information, the marine insurance information, the import expense information, the import warehouse expense information, the import interest information, and the import margin information are stored in the master table as percentage values on a per material basis, wherein the calculation table indicates entries included in the import and export expense ratio, wherein the entries include an entry corresponding to the basic import export expense information, and an entry represented by a formula using the basic import and export expense information, wherein in said calculating of the import and export expense ratio, the import and export expense ratio is calculated using a sum of respective percentage values of the following information stored in the master table: the export warehouse expense; the export margin; the export interest; the export expense; the transportation expense; the marine insurance; the import expense; the import warehouse expense; a stock point transportation expense; the import interest; and the import margin, and wherein, in said calculating of the landed price, the landed price is calculated using, as the import and export expense, a price obtained by multiplying the local price by the import and export expense ratio calculated in said calculating of the import and export expense ratio.

* * * * *